United States Patent
Lee et al.

(10) Patent No.: US 9,897,854 B2
(45) Date of Patent: Feb. 20, 2018

(54) LIQUID CRYSTAL DISPLAY HAVING IMPROVED COLOR REPRODUCTION

(71) Applicant: SAMSUNG DISPLAY CO., LTD., Yongin-si, Gyeonggi-do (KR)

(72) Inventors: Baek Hee Lee, Yongin-si (KR); Nam Seok Roh, Seongnam-si (KR); Seung-Won Park, Seoul (KR); Hae Il Park, Seoul (KR)

(73) Assignee: Samsung Display Co., Ltd. (KR)

(*) Notice: Subject to any disclaimer, the term of this patent is extended or adjusted under 35 U.S.C. 154(b) by 234 days.

(21) Appl. No.: 14/986,106

(22) Filed: Dec. 31, 2015

(65) Prior Publication Data
US 2016/0195775 A1  Jul. 7, 2016

(30) Foreign Application Priority Data

Jan. 5, 2015 (KR) .................. 10-2015-0000728
Jun. 3, 2015 (KR) .................. 10-2015-0078618

(51) Int. Cl.
*G02F 1/1335* (2006.01)
*G02F 1/1333* (2006.01)
(Continued)

(52) U.S. Cl.
CPC ...... *G02F 1/133617* (2013.01); *G02F 1/1368* (2013.01); *G02F 1/13362* (2013.01); (Continued)

(58) Field of Classification Search
CPC ..... G02F 1/133603; G02F 2001/01783; G02F 2001/01791
See application file for complete search history.

(56) References Cited

U.S. PATENT DOCUMENTS 7,649,594 B2    1/2010  Kim et al.
2013/0032768 A1  2/2013  Arbell et al.
(Continued)

FOREIGN PATENT DOCUMENTS

KR  10-2006-0113160 A   11/2006
KR  10-2012-0112924 A   10/2012
(Continued)

OTHER PUBLICATIONS

Frank S. Bates et al., "Block Copolymers-Designer Soft Materials," Physics Today, Feb. 1999, pp. 32-38, vol. 52, No. 2, AIP Publishing.
(Continued)

*Primary Examiner* — Phu Vu
(74) *Attorney, Agent, or Firm* — Innovation Counsel LLP

(57) ABSTRACT

A liquid crystal display according to an exemplary embodiment of the present invention includes: a display panel, and a color conversion layer coupled to the display panel and having a color conversion layer, where the color conversion layer includes a block copolymer including a first copolymer and a second copolymer, and quantum rods dispersed within the block copolymer. The block copolymer includes a first block structure unit formed by the first copolymer; and a second block structure unit formed by the second copolymer, where the quantum rods is are disposed within either one of the first block structure unit and the second block structure unit.

15 Claims, 13 Drawing Sheets

(51) Int. Cl.
*G02F 1/1368* (2006.01)
*B82Y 20/00* (2011.01)

(52) U.S. Cl.
CPC .. *G02F 1/133345* (2013.01); *G02F 1/133377* (2013.01); *G02F 1/133528* (2013.01); *G02F 1/133603* (2013.01); *B82Y 20/00* (2013.01); *G02F 2001/133614* (2013.01); *G02F 2202/36* (2013.01); *Y10S 977/773* (2013.01); *Y10S 977/952* (2013.01)

(56) References Cited

U.S. PATENT DOCUMENTS

| | | | |
|---|---|---|---|
| 2014/0009902 A1 | 1/2014 | Banin et al. | |
| 2014/0340865 A1 | 11/2014 | Hikmet et al. | |
| 2017/0123128 A1* | 5/2017 | Wu | G02B 1/02 |
| 2017/0255051 A1* | 9/2017 | Liu | G02F 1/133377 |

FOREIGN PATENT DOCUMENTS

| | | |
|---|---|---|
| KR | 10-2013-0123718 A | 11/2013 |
| KR | 10-2014-0046840 A | 4/2014 |
| WO | 2010095140 A2 | 8/2010 |

OTHER PUBLICATIONS

Kuan-Ju Wu et al., "CdS Nanorods Imbedded in Liquid Crystal Cells for Smart Optoelectronic Devices," Nano Letters, Mar. 2007, pp. 1908-1913, vol. 7, No. 7, American Chemical Society.

Ranjan D. Deshmukh et al., "Two-Dimensional Confinement of Nanorods in Block Copolymer Domains," Nano Letters, Aug. 2007, pp. 3662-3668, vol. 7, No. 12, American Chemical Society.

European Search Report for European Patent Application No. 16150038.4, European Patent Office, dated May 11, 2016, 10 pages, Munich, Germany.

* cited by examiner

LIQUID CRYSTAL DISPLAY HAVING IMPROVED COLOR REPRODUCTION

CROSS-REFERENCE TO RELATED APPLICATION

This application claims priority to, and the benefit of, both Korean Patent Application No. 10-2015-0000728 filed in the Korean Intellectual Property Office on Jan. 5, 2015, and Korean Patent Application No. 10-2015-0078618 filed in the Korean Intellectual Property Office on Jun. 3, 2015, the entire contents of each of which are incorporated herein by reference.

BACKGROUND (a) Field

Embodiments of the present invention relate generally to liquid crystal displays. More specifically, embodiments of the present invention relate to liquid crystal displays having improved color reproduction.

(b) Description of the Related Art

A liquid crystal display (LCD), unlike a plasma display panel (PDP) or a field emission display (FED), is a non-emissive display device that does not form an image by autonomously emitting light. Rather, it forms images by relying on externally-generated light. Therefore, in the LCD, a backlight unit (BLU) outputting light to a rear surface thereof is utilized.

The backlight unit for the LCD employs a cold cathode fluorescent lamp (CCFL) as its light source. However, use of CCFLs results in LCDs that are excessively large, suffer from low color purity, and have non-uniform luminance.

Recently, a backlight unit adopting three color light emitting diodes (three color LEDs) as a light source has been developed. Backlights adopting three color LEDs as their light sources can reproduce images with high color purity, and thus can be used in high quality display devices. However, the resulting cost is high.

In order to overcome this drawback, a white LED converting light emitted from a single color LED chip into white output light has been developed. However, the color reproducibility of white LEDs is lower than that of the three color LED.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a color conversion layer providing improved color reproducibility, and a liquid crystal display including the same.

An exemplary embodiment of the present invention provides a liquid crystal display including: a display panel, and a color conversion panel coupled to the display panel and having a color conversion layer, in which the color conversion layer includes a block copolymer including a first copolymer and a second copolymer, and quantum rods dispersed within the block copolymer. The block copolymer is separated into a first block structure unit formed by the first copolymer and a second block structure unit formed by the second copolymer, and the quantum rods are disposed within either one of the first block structure unit and the second block structure unit.

At least one of the first block structure unit and the second block structure unit may have a lamellar or cylindrical shape.

The quantum rod may be arranged to be oriented substantially along one direction.

The quantum rods may include a red quantum rod and a green quantum rod.

The liquid crystal display may further comprise a light assembly adjacent to the color conversion panel, the color conversion layer may be provided between the light assembly and the display panel, and the light assembly may comprise a light emitting diode.

The light emitting diode may be configured to emit light in a predetermined wavelength band, such as an ultraviolet light or blue light band.

The color conversion panel may further include a lower insulating substrate, and the color conversion layer may be provided on the lower insulating substrate.

The display panel may include: a thin film transistor provided on the color conversion layer; a pixel electrode connected to the thin film transistor; an upper insulating substrate spaced apart from and facing the pixel electrode; a liquid crystal layer provided between the lower insulating substrate and the upper insulating substrate; and a common electrode provided between the upper insulating substrate and the liquid crystal layer.

The liquid crystal display may further include a lower insulating layer provided between the color conversion layer and the thin film transistor The liquid crystal display may further include a polarizer provided on the upper insulating substrate.

The display panel may include: an insulating substrate facing the lower insulating substrate; a thin film transistor provided on a surface of the insulating substrate that faces the lower insulating substrate; a pixel electrode connected to the thin film transistor; a roof layer facing the pixel electrode; and a liquid crystal layer provided in a plurality of microcavities positioned between the pixel electrode and the roof layer.

The liquid crystal display may further include an overcoat positioned between the color conversion layer and the roof layer.

The liquid crystal display may further include a polarizer provided on the the insulating substrate; and a common electrode arranged to form an electric field together with the pixel electrode.

The display panel may comprise: an insulating substrate provided on the color conversion layer; a thin film transistor provided on the insulating substrate; a pixel electrode connected to the thin film transistor; a roof layer facing the pixel electrode; and a liquid crystal layer provided in a plurality of microcavities positioned between the pixel electrode and the roof layer.

The liquid crystal display may further comprise a polarizer provided on the roof layer; and a common electrode arranged to form an electric field together with the pixel electrode.

According to the exemplary embodiment of the present invention, the color conversion layer and the liquid crystal display including the same have desirable color reproducibility, and thus it is possible to provide improved display quality.

DETAILED DESCRIPTION OF THE EMBODIMENTS

Figure 1A:
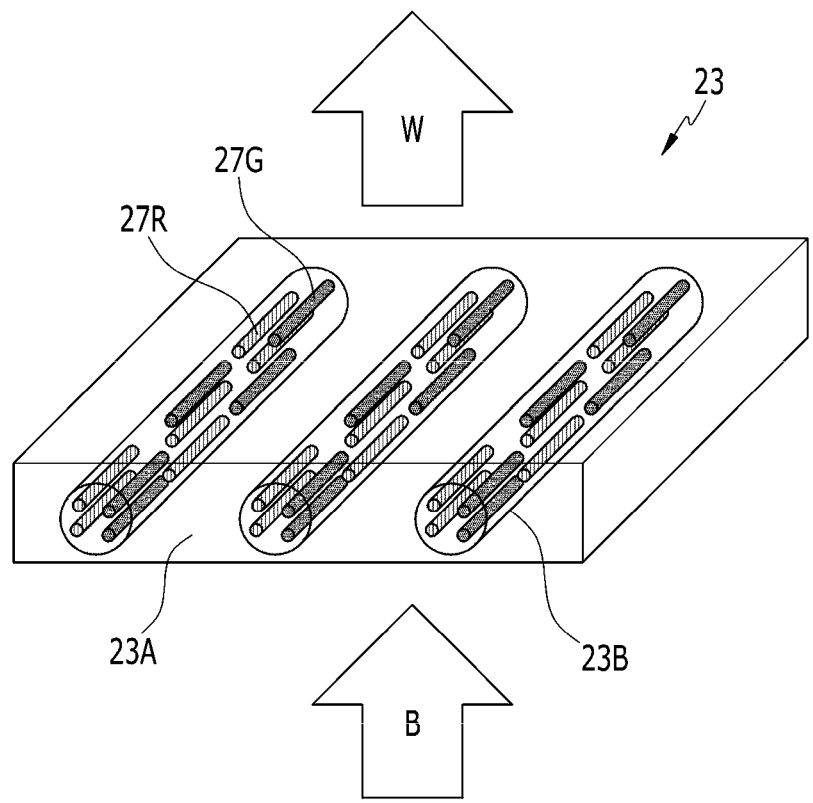
FIG. 1A is a perspective view of a color conversion layer according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

Figure 1B:
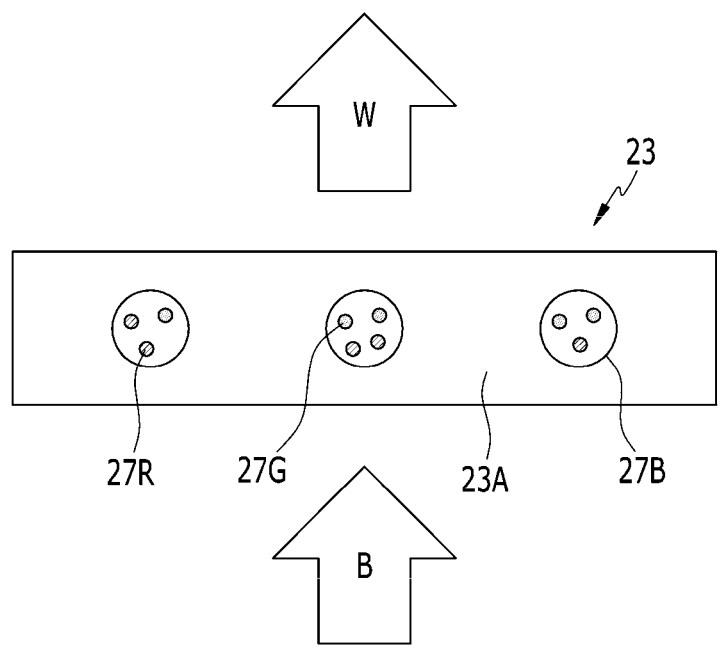
FIG. 1B is a cross-sectional view of the color conversion layer according to the exemplary embodiment of the present invention.

Hereinafter, a color conversion layer according to an exemplary embodiment of the present invention will be reviewed with reference to FIG. 1. FIG. 1A is a perspective view of the color conversion layer according to the exemplary embodiment of the present invention, and FIG. 1B is a cross-sectional view of the color conversion layer according to the exemplary embodiment of the present invention.

First, a color conversion layer 23 according to this exemplary embodiment of the present invention includes block copolymers including a first block structure unit 23A and a second block structure unit 23B respectively formed by a first copolymer and a second copolymer, and quantum rods 27R and 27G disposed to be dispersed in either one of the first block structure unit 23A and the second block structure unit 23B.

The block copolymers comprising the first block structure unit 23A and the second block structure unit 23B are polymers where at least two block structure units having different chemical properties are connected by covalent bonding. In order to minimize thermodynamic energy, the first block structure unit 23A and the second block structure unit 23B may be self-assembled to form uniform block structure units having a size of several nanometers to several tens of nanometers.

In this case, the repeated block structure units may have various shapes such as those including a sphere, a cylinder, and a lamella. The exemplary embodiment of the present invention illustrated in FIG. 1A is an example, and one block structure unit may have a cylinder shape as shown. The block copolymer formed as described above is thermodynamically stable. To synthesize this block copolymer, a kind and a ratio of monomers, a molecular weight of a polymer, and the like may be adjusted to control the size, the shape, and physical properties of the self-assembled block structure unit.

In other words, the block copolymers 23A and 23B according to the exemplary embodiment of the present invention include a first copolymer and a second copolymer, and the copolymers may form separate and distinct first block structure units 23A and second block structure units 23B during the synthesis step. Referring to FIG. 1A and FIG. 1B, the second block structure unit 23B may have a cylindrical shape extending parallel to a substrate, and the first block structure unit 23A may have a shape that surrounds the second block structure unit. In the present exemplary embodiment, such a structure of each of the block structure units 23A and 23B is referred to as a cylinder-shaped structure.

The block copolymers comprising the first block structure unit 23A and the second block structure unit 23B may be made of any material that can form a plurality of divided areas, and the material may include polyacrylonitrile-b-polydimethylsiloxane, polyethylene oxide-b-polydimethylsiloxane, poly(2-vinylpyridine)-b-polydimethylsiloxane, poly(4-vinylpyridine)-b-polydimethylsiloxane, polymethyl methacrylate-b-polydimethylsiloxane, polyacrylonitrile-b-polypropylene, poly(ethylene oxide)-b-polypropylene, polyacrylonitrile-b-polyisobutylene, poly(ethylene oxide)-b-polyisobutylene, polyacrylonitrile-b-polyethylene, poly (ethylene oxide)-b-polyethylene, polyacrylonitrile-b-polyisoprene, poly(ethylene oxide)-b-polyisoprene, polyacrylonitrile-b-poly(meth)acrylate, poly(ethylene oxide)-b-poly(meth)acrylate, polyacrylonitrile-b-polychloroprene, poly(ethylene oxide)-b-polychloroprene, polyacrylonitrile-b-polystyrene, poly(ethylene oxide)-b-polystyrene, polyacrylonitrile-b-poly(vinyl chloride), polyacrylonitrile-b-poly (vinyl acetate), polyacrylonitrile-b-poly(2-vinylpyridine), polyacrylonitrile-b-poly(4-vinylpyridine), and the like, but are not limited thereto.

Further, the present specification describes the case where the block copolymer is a diblock copolymer (i.e., a copolymer having two block structure units), but the block copolymer is not limited thereto, and may include a triblock copolymer (i.e., a copolymer having three block structure units), a multi-block copolymer (i.e., a copolymer having four or more block structure units), and/or any combination thereof.

A plurality of first block structure units 23A and second block structure units 23B may exist at a weight ratio of about 10:90 to about 90:10 and more specifically about 30:70 to about 70:30. In the case where the first block structure unit 23A and the second block structure unit 23B exist at a weight ratio in the aforementioned range, a process condition for forming various patterns may be more readily adjusted.

Specifically, after the block copolymers including the first copolymer and the second copolymer are applied, ultraviolet ray treatment or heat treatment may be performed, and thus the first block structure unit 23A and the second block structure unit 23B may form a cylindrical configuration as shown in FIG. 1. This will be described in detail later with reference to FIG. 3.

The quantum rods 27G and 27R according to the exemplary embodiment of the present invention are dispersed in either one of the first block structure unit 23A and the second block structure unit 23B. Referring to FIG. 1A and FIG. 1B, the quantum rods 27G and 27R are dispersed in the second block structure unit 23B, but the invention is not limited thereto, and the rods may be selectively located in either one of the first block structure unit 23A and the second block structure unit 23B.

The quantum rods 27G and 27R are disposed in either one of the first block structure unit 23A and the second block structure unit 23B, and may be arranged to extend along one particular direction. According to the exemplary embodiment of the present invention, the quantum rods 27G and 27R may be located in the second block structure unit 23B, and specifically, may be arranged to extend along a length direction in the cylinder-shaped second block structure unit 23B. That is, the major axes of the rods 27G, 27R are substantially collinear with the major axes of their second block structure units 23B.

According to the exemplary embodiment of the present invention, a color conversion layer 23 including quantum rods 27G and 27R dispersed within a block copolymer and thus arranged along one direction can be provided. In this case, blue light B is incident to one surface of the color conversion layer 23, and passes through color conversion layer 23 which includes a red quantum rod and a green quantum rod arranged in one direction, with the net result being the output of white light W polarized in one direction. That is, the blue light, the green light, and the red light are mixed and polarized such that white light W can be produced. Further, the incident blue light is emitted as light having an isotropic property, and accordingly a wide view angle can be improved.

Any material is contemplated for the quantum rods 27G and 27R. Embodiments of the invention encompass use of any of the various materials capable of forming the quantum rods 27G and 27R, and these materials include a material capable of manufacturing quantum dots.

The quantum rods 27G and 27R have a diameter of several nanometers when a cross-section is taken at their center, and may have a length of several tens or several hundreds of nanometers. According to the exemplary embodiment, a portion of the quantum rods 27G and 27R may be arranged at an angle of more than 0° and 10° or less with respect to a particular direction, e.g. the row direction or the column direction of pixels of the display of color conversion layer 23. The diameters of the central cross-sections of the quantum rods 27G and 27R included in the color conversion layer 23 may be the same. Moreover, according to the exemplary embodiment, two kinds of quantum rods 27G and 27R having differing central cross-section diameters may be included. Further, according to the exemplary embodiment, three or more kinds of quantum rods 27G and 27R having differing central cross-section diameters may be included. According to a difference in diameter of the central cross-sections of the quantum rods 27G and 27R, wavelength ranges of light polarized in an extension direction of the quantum rods 27G and 27R may vary. As a result, in the exemplary embodiment where the quantum rods 27G and 27R have multiple different central cross-sectional diameters, lights having various wavelengths may be polarized in the extension direction of the quantum rods 27G and 27R.

As previously described, the color conversion layer 23 has a polarization property. That is, light that is incident on the color conversion layer 23 is polarized along an arrangement direction of the quantum rods 27G and 27R. A transmissive axis of the color conversion layer 23 is identical to the arrangement direction of the quantum rods 27G and 27R. Such a color conversion layer 23 can replace a polarizer, and therefore, according to the exemplary embodiment of the present invention, at least one polarizer may be omitted from the liquid crystal or other display device.

Figure 2A:
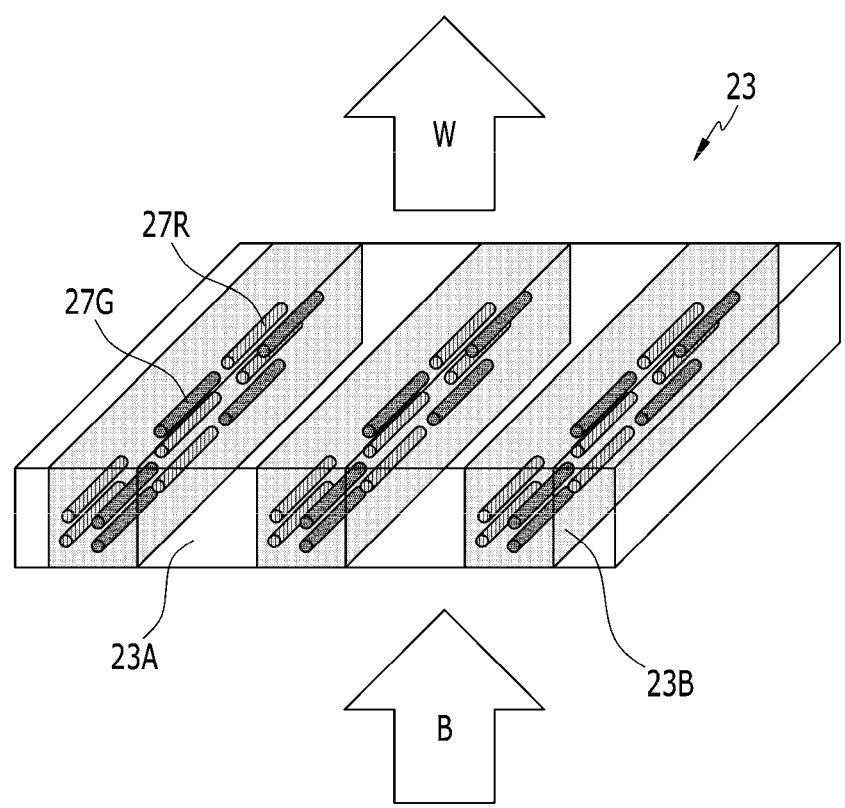
FIG. 2A is a perspective view of a color conversion layer according to another exemplary embodiment of the present invention.
Figure 2B:
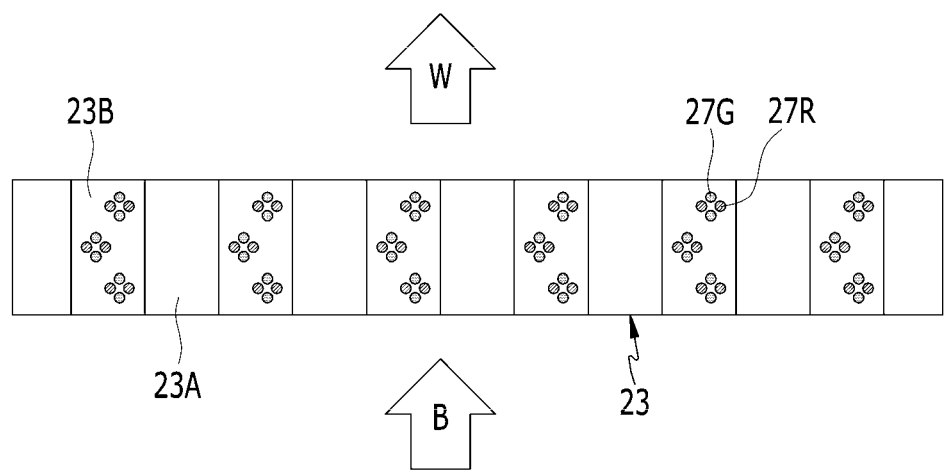
FIG. 2B is a cross-sectional view of this color conversion layer.

Hereinafter, a color conversion layer according to another exemplary embodiment of the present invention will be described with reference to FIG. 2A and FIG. 2B. FIG. 2A is a perspective view of a color conversion layer according to another exemplary embodiment of the present invention, and FIG. 2B is a cross-sectional view of this color conversion layer.

A color conversion layer 23 according to another exemplary embodiment of the present invention includes block copolymers 23A and 23B including a first block structure unit 23A formed by a first copolymer and a second block structure unit 23B formed by a second copolymer, and quantum rods 27R and 27G dispersed within either one of the first block structure unit 23A and the second block structure unit 23B.

The block copolymers comprising the first block structure unit 23A and the second block structure unit 23B are polymers where at least two block structure units having different chemical properties are connected by covalent bonding. The first copolymer and the second copolymer form separate and distinct first block structure units 23A and second block structure units 23B according to a manufacturing process. The first block structure unit 23A and the second block structure unit 23B according to another exemplary embodiment of the present invention may have a rectangular pillar shape. Alternatively, they may have a lamella or membrane shape where the first block structure unit 23A and the second block structure unit 23B are alternately disposed. The formed block structures are thermodynamically stable, and in a synthesis step of the block copolymer, a kind and a ratio of monomers, a molecular weight of a polymer, and the like may be adjusted to control the size and physical properties of the self-assembled block structure unit.

Any suitable material may be used in forming the block copolymers comprising the first block structure unit 23A and the second block structure unit 23B according to the exemplary embodiment of the present invention. For example, any material that results in a lamella shape can be used if that shape is desired, and an example thereof may be polyacrylonitrile-b-polydimethylsiloxane, polyethylene oxide-b-polydimethylsiloxane, poly(2-vinylpyridine)-b-polydimethylsiloxane, poly(4-vinylpyridine)-b-polydimethylsiloxane, polymethyl methacrylate-b-polydimethylsiloxane, polyacrylonitrile-b-polypropylene, poly(ethylene oxide)-b-polypropylene, polyacrylonitrile-b-polyisobutylene, poly(ethylene oxide)-b-polyisobutylene, polyacrylonitrile-b- polyethylene, poly(ethylene oxide)-b-polyethylene, polyacrylonitrile-b-polyisoprene, poly(ethylene oxide)-b-polyisoprene, polyacrylonitrile-b-poly(meth)acrylate, poly(ethylene oxide)-b-poly(meth)acrylate, polyacrylonitrile-b-polychloroprene, poly(ethylene oxide)-b-polychloroprene, polyacrylonitrile-b-polystyrene, poly(ethylene oxide)-b-polystyrene, polyacrylonitrile-b-poly(vinyl chloride), polyacrylonitrile-b-poly(vinyl acetate), polyacrylonitrile-b-poly(2-vinylpyridine), polyacrylonitrile-b-poly(4-vinylpyridine), and the like, but the materials are not limited thereto.

Further, the present specification describes the case where the block copolymer is a diblock copolymer (i.e., a copolymer having two block structure units), but the block copolymer is not limited thereto, and may include a triblock copolymer (i.e., a copolymer having three block structure units), a multi-block copolymer (i.e., a copolymer having four or more block structure units), and any combination thereof.

The first block structure unit 23A and the second block structure unit 23B may exist at a weight ratio of about 10:90 to about 90:10, and more specifically about 30:70 to about 70:30. In the case where the first block structure unit 23A and the second block structure unit 23B exist at a weight ratio in the aforementioned range, a process condition for forming various patterns may be more readily adjusted.

Specifically, after the block copolymers including the first copolymer and the second copolymer are applied, ultraviolet ray treatment or heat treatment may be performed, and thus the block copolymers may form a vertical lamella shape as in FIGS. 2A and 2B. This will be described in detail later with reference to FIG. 4.

The quantum rods 27G and 27R according to the exemplary embodiment of the present invention are disposed to be dispersed in the block copolymers, and specifically may be disposed in either one of the first block structure unit 23A and the second block structure unit 23B. Referring to FIG. 2A and FIG. 2B, the quantum rods 27G and 27R are disposed to be dispersed in the second block structure units 23B, but are not limited thereto, and may be selectively disposed in either one of the first block structure units 23A and the second block structure units 23B.

The quantum rods 27G and 27R may be arranged along one direction in either one of the first block structure unit 23A and the second block structure unit 23B. For example, as shown in FIG. 2A and FIG. 2B, the quantum rods 27G and 27R may be arranged along a length direction of a lamella shape.

According to the exemplary embodiment of the present invention, a color conversion layer 23 including the quantum rods 27G and 27R dispersed in the block copolymers and thus arranged along one direction can be provided. When blue light B is incident on one surface of the color conversion layer 23, the blue light B is passed through the color conversion layer 23 which includes a red quantum rod 27R and a green quantum rod 27G arranged along one direction. The incident light is thus emitted as white light W polarized in one direction. That is, the blue light, the green light, and the red light are mixed and polarized such that white light W can be produced. Further, the blue light B is passed through the color conversion layer 23 and is thus emitted as light having an isotropic property, and accordingly a wide view angle can be improved.

A material of the quantum rods 27G and 27R is not limited, various materials capable of forming the quantum rods 27G and 27R may be used, and the materials include a material capable of manufacturing quantum dots.

The quantum rods 27G and 27R have a diameter of several nanometers when a cross-section is taken at the center, and may have a length of several tens or several hundreds of nanometers. According to the exemplary embodiment, a portion of the quantum rods 27G and 27R may be arranged at an angle of more than 0° and 10° or less with respect to a particular direction, e.g. the row direction or the column direction of pixels of the display of color conversion layer 23. The diameters of the central cross-sections of the quantum rods 27G and 27R included in the color conversion layer 23 may all be substantially the same. Alternatively, according to the exemplary embodiment, two kinds of quantum rods 27G and 27R having different central cross-sectional diameters may be included. Further, according to the exemplary embodiment, three or more kinds of quantum rods 27G and 27R having different central cross-sectional diameters may be included. According to a difference in diameter of the central cross-sections of the quantum rods 27G and 27R, wavelength ranges of light polarized in an extension direction of the quantum rods 27G and 27R are different from each other. As a result, in the exemplary embodiment where there are multiple different central cross-sectional diameters of the quantum rods 27G and 27R, light having various wavelengths may be polarized in the extension direction of the quantum rods 27G and 27R.

As previously described, the color conversion layer 23 has a polarization property. Light that is incident on the color conversion layer 23 is polarized along an arrangement direction of the quantum rods 27G and 27R to be emitted as polarized light. A transmissive axis of the color conversion layer 23 is identical to the arrangement direction of the quantum rods 27G and 27R. Such a color conversion layer 23 can replace a polarizer, and therefore, according to the present exemplary embodiment, a polarizer can be omitted from the display.

Figure 3:
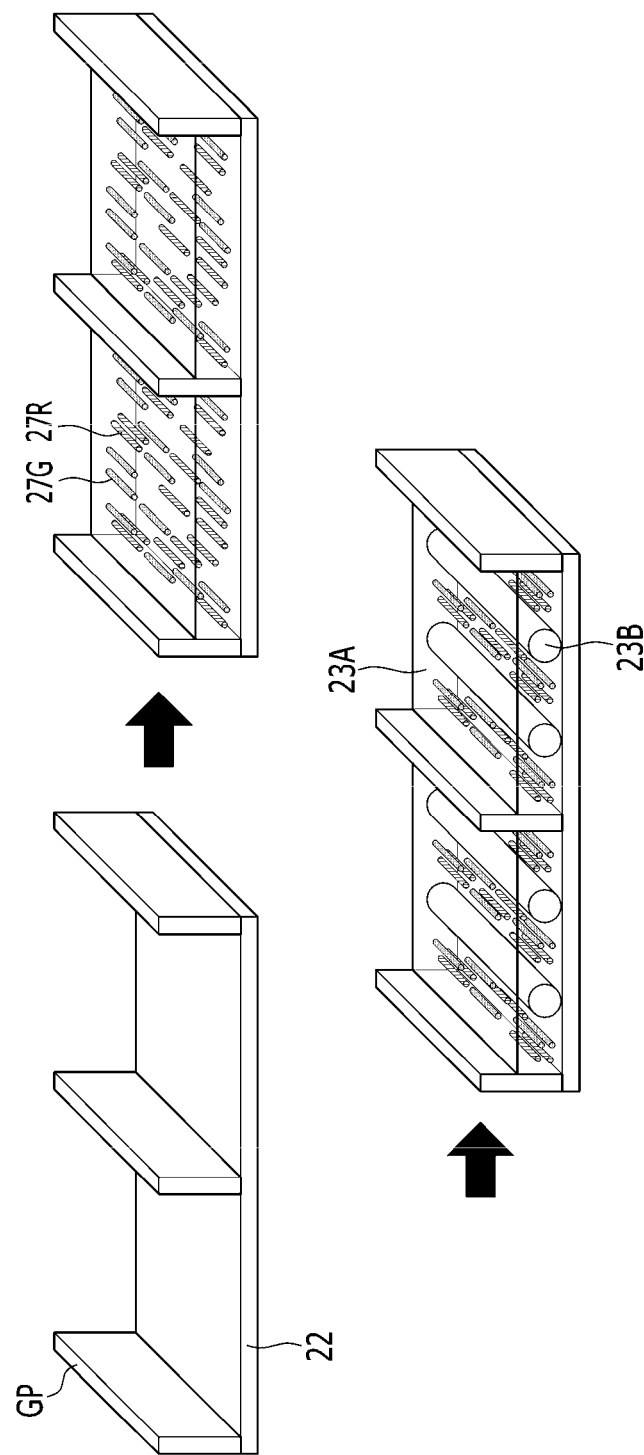
FIG. 3 is a perspective view illustrating a process of manufacturing a color conversion panel according to an exemplary embodiment of the present invention.

Hereinafter, a process of manufacturing a color conversion panel according to the exemplary embodiment of the present invention will be reviewed with reference to FIGS. 3 and 4. FIG. 3 is a perspective view illustrating a process of manufacturing a color conversion panel according to the exemplary embodiment of the present invention, and FIG. 4 is a perspective view illustrating a process of manufacturing a color conversion panel according to another exemplary embodiment of the present invention.

Figure 4:
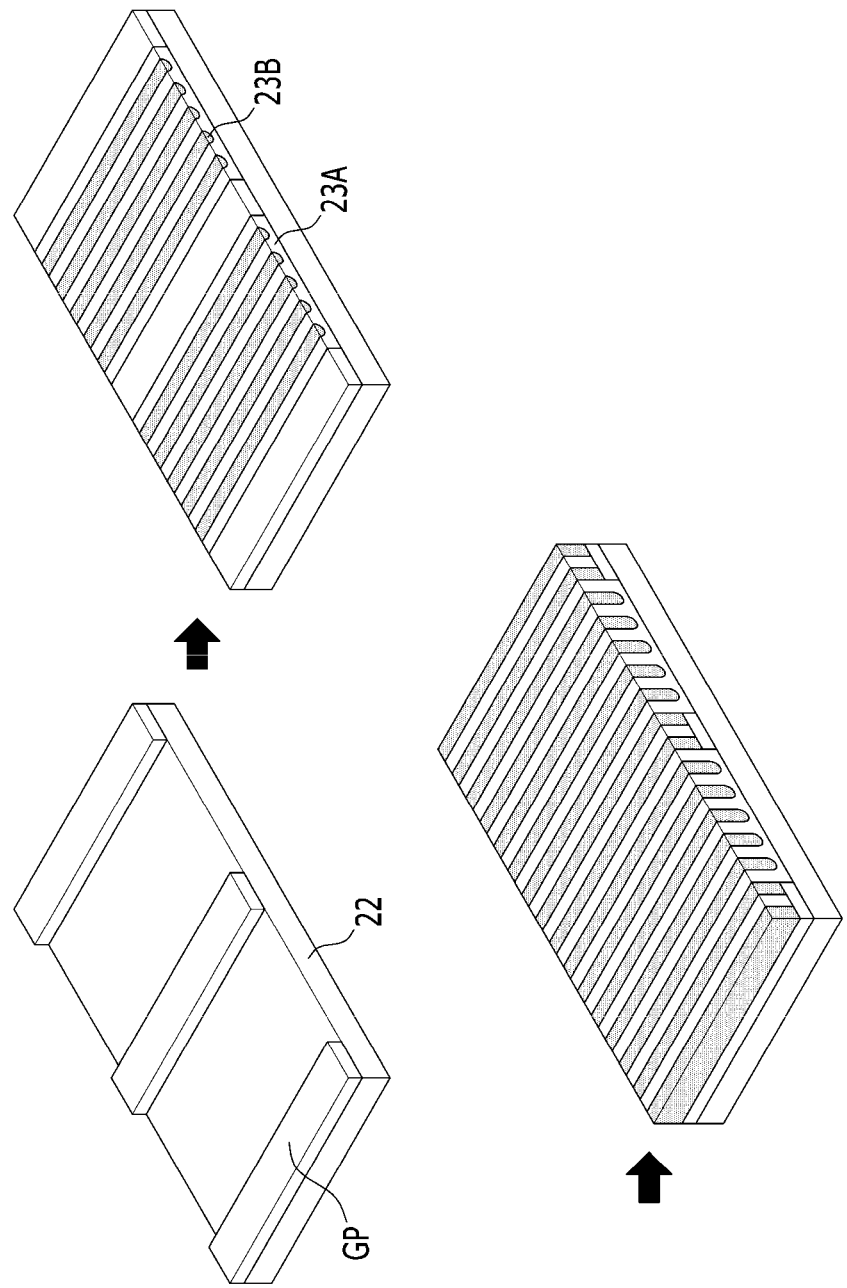
FIG. 4 is a perspective view illustrating a process of manufacturing a color conversion panel according to another exemplary embodiment of the present invention.

First, as illustrated in FIGS. 3 and 4, quantum rods 27R and 27G are dispersed on an insulation substrate 22 in which a guide pattern GP is disposed, and a block copolymer including a first copolymer and a second copolymer is applied. Next, a heat treatment process is performed according to a ratio of the first copolymer and the second copolymer included in the block copolymer. According to the heat treatment process, the block copolymer may form a predetermined pattern according to the guide pattern GP.

Specifically, in the case where a mole fraction between the first copolymer and the second copolymer is appropriately adjusted, the block copolymer may be subjected to phase separation into a plurality of individual regions (a first block structure unit and a second block structure unit 23A and 23B) by heat treatment at a predetermined temperature.

The heat treatment process may be performed at a glass transition temperature or more and less than a thermal decomposition temperature of the block copolymer. The heat treatment time is not particularly limited. Fine phase separation of the block copolymer occurs by heat treatment.

According to the aforementioned manufacturing process, in the exemplary embodiment of the present invention, as illustrated in FIG. 3, a cylinder-shaped block copolymer may be formed, or as illustrated in FIG. 4, a lamella-shaped block copolymer may be formed.

Further, referring to FIG. 3, the quantum rods dispersed in the block copolymer are selectively disposed in either one of the first block structure unit 23A and the second block structure unit 23B according to phase separation, and may be arranged in one direction according to the guide pattern GP.

The exemplary embodiment of FIG. 4 is not separately described in detail, but the quantum rods may be disposed to be arranged in one direction and within either one of the first block structure unit 23A and the second block structure unit 23B.

Figure 5:
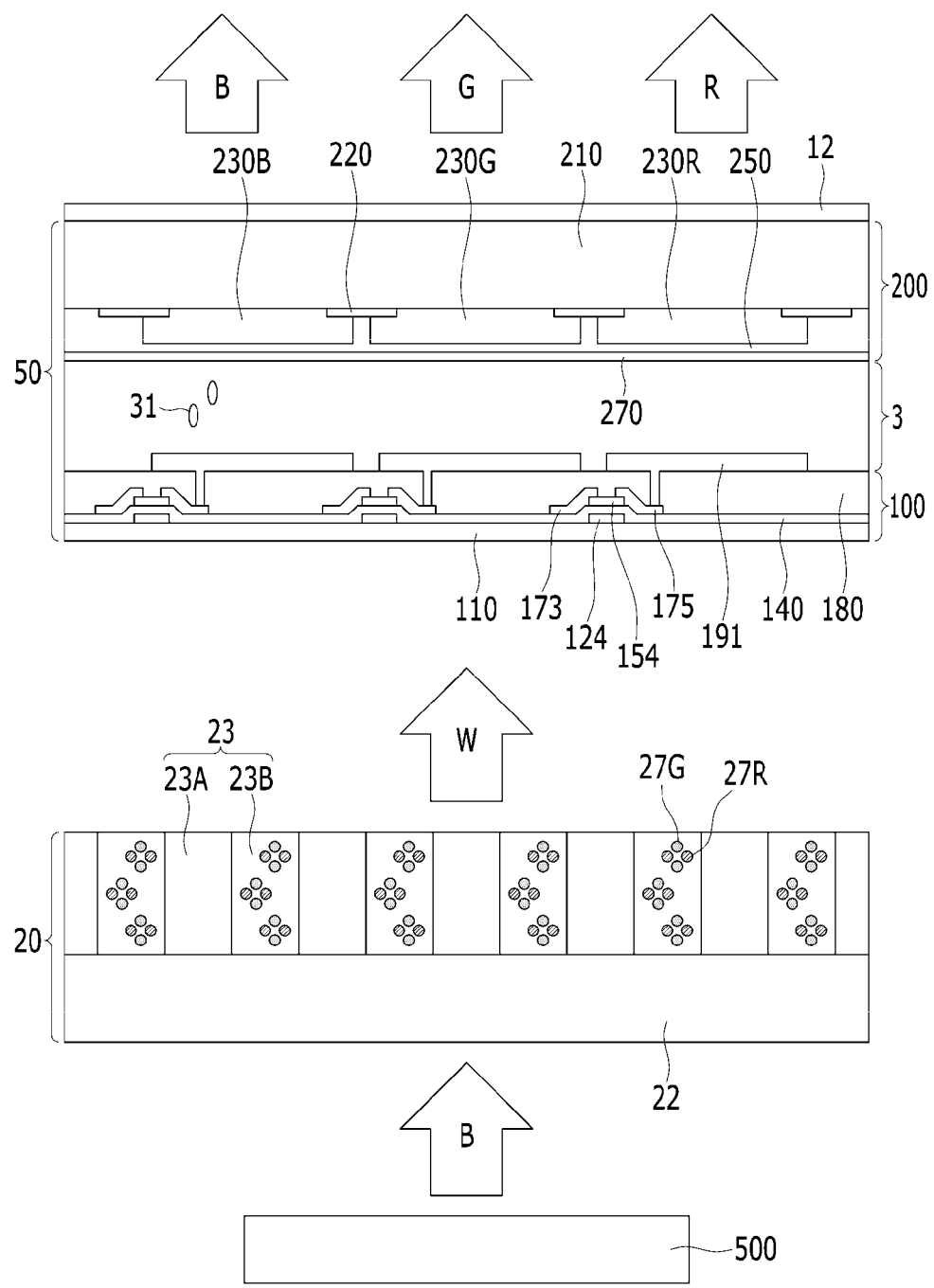
FIG. 5 is a cross-sectional view of a display device according to an exemplary embodiment of the present invention.
Figure 6:
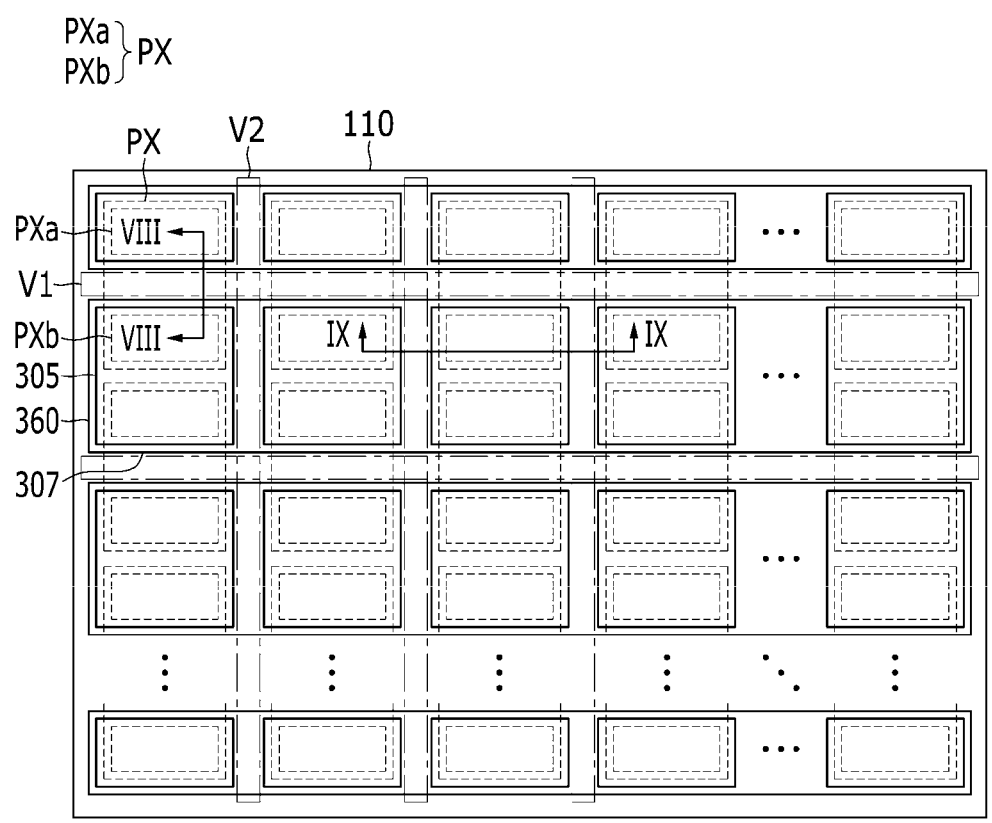
FIG. 6 is a plan view of a display device according to another exemplary embodiment of the present invention.

Hereinafter, a liquid crystal display including the color conversion layer according to the exemplary embodiment of the present invention will be reviewed with reference to FIG. 5. FIG. 5 is a cross-sectional view of a display device according to the exemplary embodiment of the present invention, and FIG. 6 is a cross-sectional view of a display device according to another exemplary embodiment of the present invention.

First, referring to FIG. 5, a liquid crystal display according to the exemplary embodiment of the present invention includes a display panel 50, a color conversion panel 20, and a light assembly 500. According to the exemplary embodiment of the present invention, the color conversion panel 20 may be provided on the light assembly 500, and the display panel 50 may be provided on the color conversion panel 20. That is, the color conversion panel 20 may be provided between the light assembly 500 and the display panel 50.

The display panel 50, in order to display an image, includes a lower display panel 100 including a thin film transistor array, an upper display panel 200 including an upper insulation substrate 210 that faces the lower display substrate 100, and a liquid crystal layer 3 interposed between the lower display panel 100 and the upper display panel 200. The display panel 50 may further include a polarizer 12 disposed on one surface of the upper display panel 200.

In this case, one or more of a coating-type polarizer, an attached-type polarizer and a wire grid polarizer may be used as the polarizer 12, and such a polarizer 12 may be provided on one surface of the upper display panel 200 using various methods such as a film form, a coating form, an attachment form, and other like processes. However, such a description is one example, and thus this is not restrictive.

First, a plurality of pixel electrodes is disposed in a matrix form on the lower insulating layer 110 of the lower display panel 100. A gate line (not shown) extending in a row direction and including a gate electrode 124, a gate insulating layer 140 disposed on the gate line (not shown), and a semiconductor layer 154 disposed on the gate insulating layer 140, are formed on the layer 110. Then, a data line (not shown) is disposed on the semiconductor layer 154 to extend in a column direction, and includes a source electrode 173 and a drain electrode 175. A passivation layer 180 is disposed on the drain electrode 175, and a pixel electrode 191 is disposed on the lower insulating layer 110 to be connected to drain electrode 175 through a contact hole.

A semiconductor layer 154 disposed on the gate electrode 124 forms a channel layer in a region exposed by the source electrode 173 and the drain electrode 175, and the gate electrode 124, the semiconductor layer 154, the source electrode 173, and the drain electrode 175 form one thin film transistor. An array of such transistors is formed as above.

Next, the upper insulating substrate 210 is provided at a predetermined distance from the lower display panel 100 while facing the lower display panel 100. A plurality of color filters 230R, 230G, and 230B and a light blocking member 220, a planarization layer 250, and a common electrode 270 are provided between the upper insulating substrate 210 and the liquid crystal layer 3. A plurality of color filters 230R, 230G, and 230B and a light blocking member 220 are provided on a surface of the upper insulating substrate 210 facing the lower display panel 100. A planarization layer 250 providing a flat surface may be disposed on a surface of the color filters 230R, 230G, and 230B and of the light blocking member 220 facing the lower display panel 100, and a common electrode 270 is disposed thereon facing the lower display panel 100. According to the exemplary embodiment of the invention, the planarization layer 250 may be omitted.

The common electrode 270 receives a common voltage to form an electric field together with the pixel electrodes 191, to arrange liquid crystal molecules 31 in the liquid crystal layer 3.

The liquid crystal layer 3 includes a plurality of liquid crystal molecules 31, and an arrangement direction of the liquid crystal molecules 31 is controlled by an electric field formed between the pixel electrode 191 and the common electrode 270. According to arrangement of the liquid crystal molecules 31, transmittance of light received from a light assembly 500 may thereby be controlled to display an image.

The present specification describes a liquid crystal display panel where a liquid crystal panel forms a vertical electric field, but is not limited thereto, and the liquid crystal display panel may instead be a display device such as a plasma display panel (PDP), a liquid crystal display panel forming a horizontal electric field, an organic light emitting diode display (OLED), a surface conduction electron-emitter display (SED), a field emission display (FED), a vacuum fluorescent display (VFD), an E-paper, or the like.

The color conversion panel 20 for polarizing light that is incident from the light assembly 500 and providing better color reproducibility may be disposed on the bottom surface of the display panel 50, and the polarizer 12 polarizing output light is disposed on one surface of the display panel on which the color conversion panel 20 is not disposed.

The color conversion panel 20 not only improves color reproducibility but also provides a polarization function, and therefore a polarizer conventionally provided on one side of the display panel 50 where the color conversion panel 20 is disposed may be omitted.

The color conversion panel 20 disposed in the bottom surface of the display panel 50, that is, between the display panel 50 and the light assembly 500, may further include the above-described color conversion layer 23 and a lower insulating substrate 22 disposed on the bottom surface of the color conversion layer 23.

The color conversion layer 23 and the lower insulating substrate 22 are provided between the light assembly 500 and the display panel 50. The color conversion layer 23 may be provided on a surface of the lower insulating substrate 22 that faces the display device 50.

The color conversion layer 23 according to the exemplary embodiment of the present invention is the same as or similar to any of the above-described color conversion layers 23, and therefore no further description of the color conversion layer 23 will be provided here.

The light assembly 500 may include a light source (not shown) disposed facing the bottom surface of the color conversion panel 20 and generating light, and a light guide plate (not illustrated) receiving the light and guiding the received light in a direction of the display panel 50 and the color conversion panel 20.

As an example of the present invention, the light assembly 500 may include at least one light emitting diode (not shown), and as the light emitting diode, a diode emitting blue light may be used, or a diode emitting ultraviolet rays may be used. A diode emitting light having light of any predetermined wavelength may be used. As described above, in the case where the light source does not emit white light but emits only light having a predetermined wavelength, since a phosphor changing light of a predetermined wavelength into white light does not need to be further formed in a light emitting diode package used as the light source, a manufacturing cost of the light source is reduced.

According to the exemplary embodiment of the present invention, blue light B is incident on the bottom surface of the color conversion panel 20 from the light assembly 500, and passes through the color conversion panel 20 which includes a red quantum rod and a green quantum rod, to output white light W polarized in one direction.

In this case, light that is incident on the color conversion layer 23 is polarized in the alignment direction of the quantum rods 27G and 27R and then emitted, and a transmissive axis of the color conversion layer 23 is identical to the arrangement direction of the quantum rods 27G and 27R (i.e. the direction of the major axes of rods 27G and 27R). The polarized white light passes through the display panel 50 to be output as red light R, green light G, and blue light B according to the color filters 230R, 230G, and 230B.

The output red light R, green light G, and blue light B are emitted in all directions, and accordingly, a wide view angle of the liquid crystal display device according to the exemplary embodiment of the present invention can be improved, and display quality can be improved through high color purity and color reproducibility.

Figure 7:
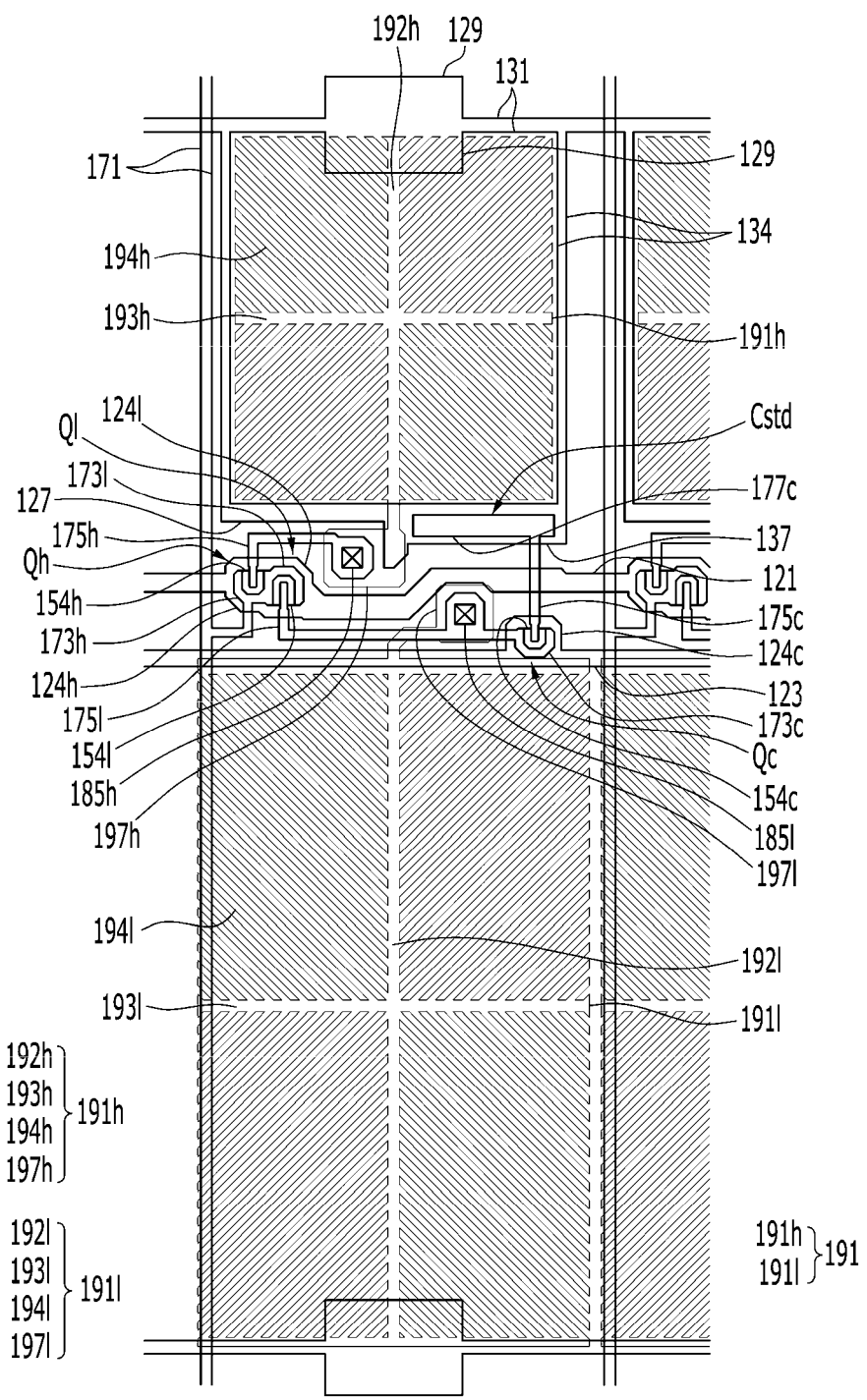
FIG. 7 is a plan view of a pixel of the display device according to FIG. 6.
Figure 8:
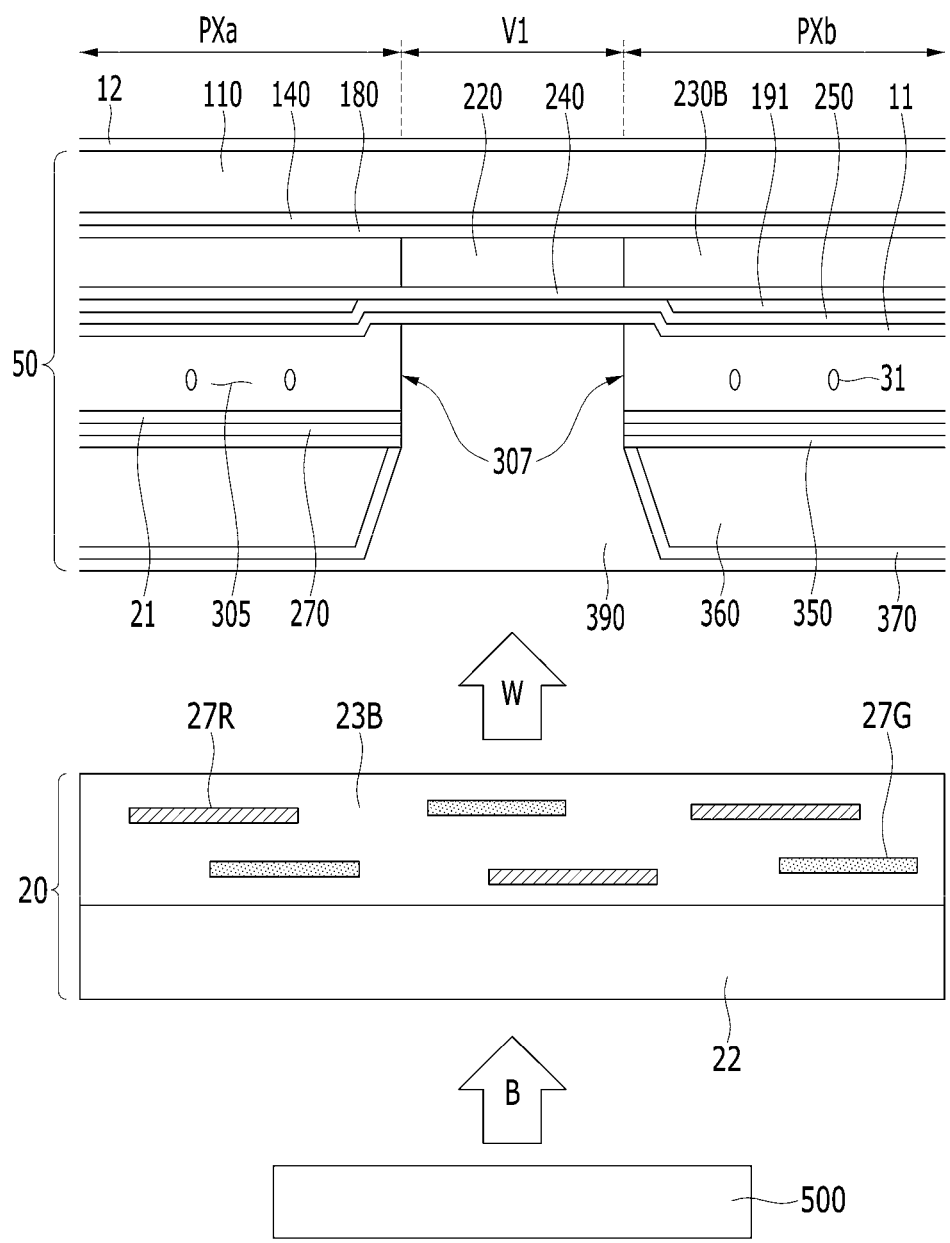
FIG. 8 is a cross-sectional view of a part of the display device of FIG. 6, taken along the line VIII-VIII.
Figure 9:
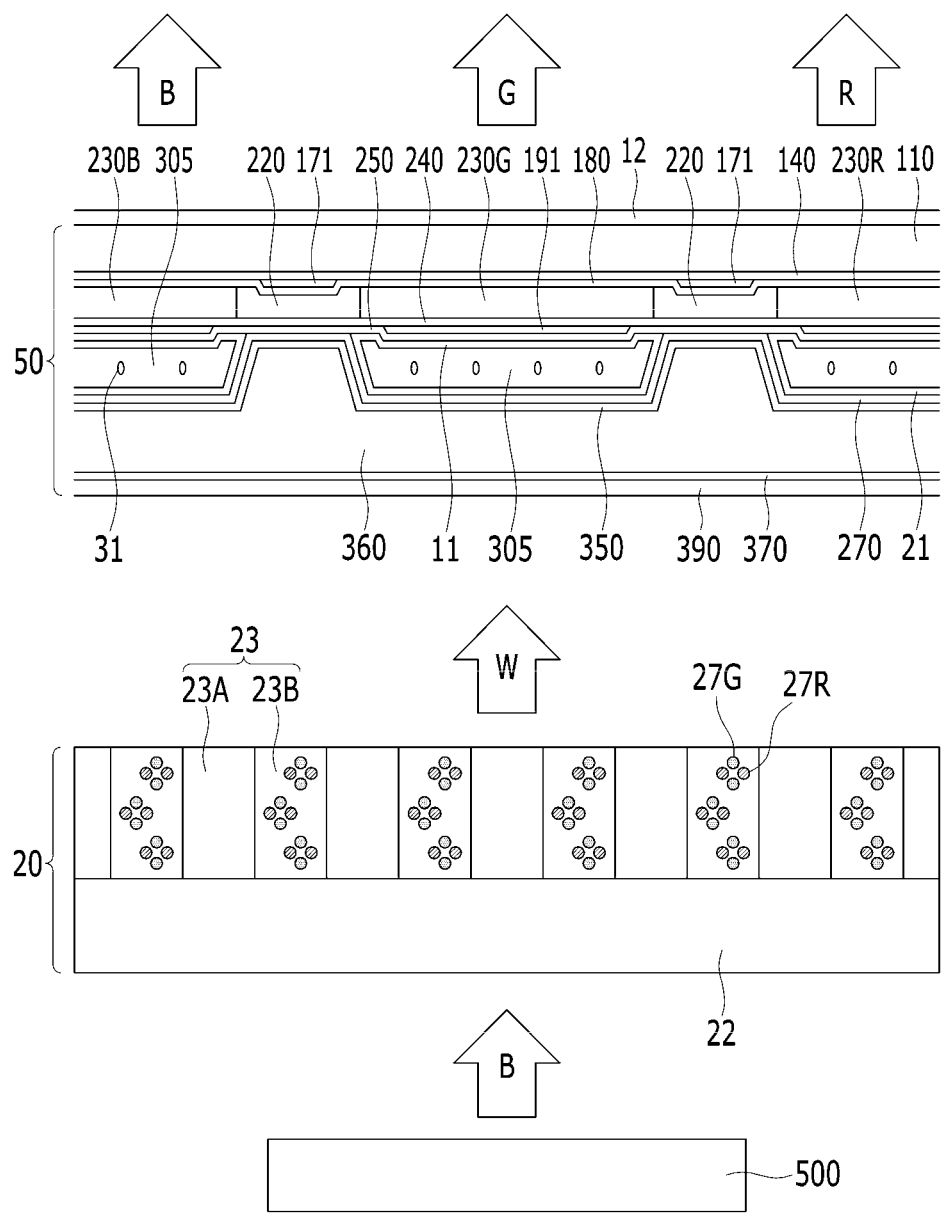
FIG. 9 is a cross-sectional view of a part of the display device of FIG. 6, taken along the line IX-IX.

Hereinafter, a liquid crystal display according to another exemplary embodiment of the present invention will be illustrated with reference to FIG. 6 to FIG. 9. FIG. 6 is a plan view of a display panel according to another exemplary embodiment of the present invention, FIG. 7 is a plan view of a pixel of the display device according to the other exemplary embodiment of the present invention, FIG. 8 is a cross-sectional view of a part of the display device of FIG. 6 taken along the line VIII-VIII, and FIG. 9 is a cross-sectional view of a part of the display device of FIG. 6 taken along the line IX-IX.

Referring to FIG. 6, a display panel according to the present exemplary embodiment will be described. In FIG. 6, a plan view of the display panel is illustrated, and a portion of its constituent elements is illustrated for convenience of description.

A display panel according to the present exemplary embodiment includes an insulating substrate 110 made of a material such as glass or plastic, and a roof layer 360 disposed on the insulating substrate 110.

The insulating substrate 110 includes a plurality of pixel areas PX. The plurality of pixel areas PX are arranged in a matrix format including a plurality of pixel rows and a plurality of pixel columns. Each pixel area PX may include a first subpixel area PXa and a second subpixel area PXb. The first subpixel area PXa and the second subpixel area PXb may be vertically arranged, although any spatial arrangement is contemplated.

A first valley V1 is disposed between the first subpixel area PXa and the second subpixel area PXb in a pixel row direction, and a second valley V2 is disposed between adjacent pixel columns.

The roof layer 360 extends in a pixel row direction. In this case, in the first valley V1, the roof layer 360 is removed to form injection holes 307 so that constituent elements disposed below the roof layer 360 are exposed.

Each roof layer 360 is formed to be separated from the insulating substrate 110 between the adjacent second valleys V2 to form a microcavity 305. Further, each roof layer 360 is formed to be attached to the insulating substrate 110 at the second valley V2 to cover both sides of the microcavity 305.

The structure of the display device according to the exemplary embodiment of the present invention described above is just one example, and may be modified in various ways. For example, the layout form of the pixel area PX, the first valleys V1, and the second valleys V2 may be modified, the plurality of roof layers 360 may be connected to each other in the first valleys V1, and a part of each roof layer 360 may be separated from the insulating substrate 110 in the second valley V2 and thus the adjacent microcavities 305 may be connected to each other.

Next, referring to FIG. 7 to FIG. 9 along with FIG. 6, a pixel area of the display device and a stacking structure of the display device according to the present exemplary embodiment will be described.

First, referring to FIG. 8 and FIG. 9, the liquid crystal display according to the present exemplary embodiment includes a display panel 50, a color conversion panel 20, and a light assembly 500.

The color conversion panel 20 is disposed on the light assembly panel 500, and the display panel 50 may be disposed on the color conversion panel 20. That is, the color conversion panel 20 may be disposed between the display panel 50 and the light assembly panel 500.

In this case, the liquid crystal display device may further include a polarizer 12 disposed on one side of the display panel 50. Specifically, the color conversion panel 20 may be disposed on the bottom surface of the display panel 50, and the polarizer 12 may be disposed on another surface of the display panel 50, neither contacting nor facing the color conversion panel 20.

In this case, one or more of a coating-type polarizer and a wire grid polarizer may be used as the polarizer 12, and such a polarizer 12 may be provided on one surface of the display panel 50 using various methods such as a film form, a coating form, an attachment form, or like process. However, such a description is merely one example, and thus this is not restrictive.

Meanwhile, the color conversion panel 20 and the light assembly 500 included in the liquid crystal display according to the present exemplary embodiment are the same as those of the above-described exemplary embodiment, and therefore no further description will be provided.

Referring to FIG. 7 to FIG. 9, the display panel 50 according to the present exemplary embodiment will be described. A plurality of gate conductors including a plurality of gate lines 121, a plurality of step-down gate lines 123, and a plurality of storage electrode lines 131 are disposed on a surface of the insulating substrate 110 facing the color conversion panel 20.

The gate line 121 and the step-down gate line 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one continuous projection. In this case, the shapes of the first, second, and third gate electrodes 124h, 124l, and 124c may be modified.

The storage electrode line 131 mainly extends in a horizontal direction and transfers a predetermined voltage such as a common voltage Vcom. The storage electrode line 131 includes storage electrodes 129 protruding upward and downward, a pair of vertical portions 134 extending downward to be substantially perpendicular to the gate line 121, and a horizontal portion 127 connecting ends of the pair of vertical portions 134.

The horizontal portion 127 includes a capacitor electrode 137 extending downward.

A gate insulating layer 140 is disposed on a surface of the gate conductor 121, 123, 124h, 124l, 124c, and 131 facing the color conversion panel 20. The gate insulating layer 140 may be made of an inorganic insulating material such as a silicon nitride (SiNx) and a silicon oxide (SiOx). Further, the gate insulating layer 140 may be formed as a single layer or a multilayer.

A first semiconductor 154h, a second semiconductor 154l, and a third semiconductor 154c are disposed on a surface of the gate insulating layer 140 facing the color conversion panel 20. The first semiconductor 154h may be disposed on the first gate electrode 124h, the second semiconductor 154l may be disposed on the second gate electrode 124l, and the third semiconductor 154c may be disposed on the third gate electrode 124c. The first semiconductor 154h and the second semiconductor 154l may be connected to each other, and the second semiconductor 154l and the third semiconductor 154c may be connected to each other.

Further, the first semiconductor 154h may be extended to the lower portion of the data line 171. The first to third semiconductors 154h, 154l, and 154c may be made of amorphous silicon, polycrystalline silicon, a metal oxide, and the like.

Ohmic contacts (not illustrated) may be further disposed on a surface of the first to third semiconductors 154h, 154l, and 154c facing the color conversion panel 20, respectively. The ohmic contacts may be made of silicide, or a material such as n+ hydrogenated amorphous silicon in which an n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is disposed on a surface of the first to third semiconductors 154h, 154l, and 154c facing the color conversion panel 20.

The data lines 171 transfer data signals and mainly extend in a vertical direction to cross the gate lines 121 and the step-down gate lines 123. Each data line 171 includes a first source electrode 173h and a second source electrode 173l which extend toward the first gate electrode 124h and the second gate electrode 124l and are connected to each other.

Each of the first drain electrode 175h, the second drain electrode 175l, and the third drain electrode 175c includes one wide end portion and an opposite rod-shaped end portion. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is bent in a 'U'-shape. A wide end portion 177c of the third drain electrode 175c overlaps the capacitive electrode 137 to form a step-down capacitor Cstd, and the rod-shaped end portion of the third drain electrode 175c is partially surrounded by the third source electrode 173c.

The first gate electrode 124h, the first source electrode 173h, and the first drain electrode 175h form a first thin film transistor Qh together with the first semiconductor 154h; the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to form a stripe shape, and may have substantially the same planar shape as the data conductor 171, 173h, 173l, 173c, 175h, 175l, and 175c and the ohmic contacts therebelow, except for channel regions between the source electrodes 173h, 173l, and 173c and the drain electrodes 175h, 173l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

The passivation layer 180 is formed on the data conductor 171, 173h, 173l, 173c, 175h, 175l, and 175c as well as the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed as a single layer or a multilayer structure.

Color filters 230R, 230G, and 230B are disposed in each pixel area PX on a surface of the passivation layer 180 facing the color conversion panel 20. Each color filter 230R, 230G, and 230B may display a primary color such as one of the three primary colors red, green, and blue. The displayed color is not limited to these three primary colors though, but the color filters 230R, 230G, and 230B may alternatively display one of cyan, magenta, yellow, and white-based colors. Unlike those illustrated above, the color filters 230R, 230G, and 230B may be elongated between the adjacent data lines 171.

A light blocking member 220 is disposed in a region between the adjacent color filters 230R, 230G, and 230B. The light blocking member 220 is formed at a boundary between the pixel area PX and the thin film transistor, to prevent light leakage. The color filters 230R, 230G, and 230B are disposed in each of the first subpixel area PXa and the second subpixel area PXb, and the light blocking member 220 may be disposed between the first subpixel area PXa and the second subpixel area PXb.

A first insulating layer 240 may be disposed on a surface of the color filters 230R, 230G, and 230B and the light blocking member 220 facing the color conversion panel 20. The first insulating layer 240 may be made of an inorganic insulating material such as a silicon nitride (SiNx), a silicon oxide (SiOx), a silicon oxynitride (SiOxNy), and the like. The first insulating layer 240 protects the color filters 230R, 230G, and 230B and the light blocking member 220, and may be omitted as necessary.

A plurality of first contact holes 185h and a plurality of second contact holes 185l are formed to expose the wide end portions of the first drain electrodes 175h and the wide end portions of the second drain electrodes 175l, respectively. The contact holes 185h, 185l are formed through the first insulating layer 240, the light blocking member 220, and the passivation layer 180.

A pixel electrode 191 is disposed on a surface of the first insulating layer 240 facing the color conversion panel 20. The pixel electrode 191 may be made of a transparent metal material such as indium tin oxide (ITO) and indium zinc oxide (IZO).

The pixel electrode 191 includes a first subpixel electrode 191h and a second subpixel electrode 191l which are separated from each other with the gate line 121 and the step-down gate line 123 therebetween, and which are respectively disposed above and below the pixel area PX based on the gate line 121 and the step-down gate line 123 to be adjacent to each other in a column direction. That is, the first subpixel electrode 191h and the second subpixel electrode 191l are separated from each other with the first valley V1 therebetween, the first subpixel electrode 191h is disposed in the first subpixel area PXa, and the second subpixel electrode 191l is disposed in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l respectively.

An overall shape of each of the first subpixel electrode 191h and the second subpixel electrode 191l is a quadrangle. The first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and projections 197h and 197l protruding downward and upward from edge sides of the subpixel electrodes 191h and 191l, respectively.

The pixel electrode 191 is divided into four domains by the horizontal stems 193h and 193l and the vertical stems 192h and 192l. The minute branches 194h and 194l obliquely extend from the horizontal stems 193h and 193l and the vertical stems 192h and 192l, and the direction of extension may form an angle of approximately 45° or 135° with the gate line 121 or the horizontal stems 193h and 193l. Further, directions of extension of the minute branches 194h and 194l of two adjacent domains may be orthogonal to each other.

The layout form of the pixel area, the structure of the thin film transistor, and the shape of the pixel electrode described above are exemplary only, and the present invention is not limited thereto and may be modified in various ways.

The second insulating layer 250 is disposed on a surface of the pixel electrode 191 facing the color conversion panel 20, and the second insulating layer 250 may be made of the same material as the first insulating layer 240. In this case, the second insulating layer 250 can be omitted.

The common electrode 270 is disposed on the pixel electrode 191 so as to be spaced apart from the pixel electrode 191 by a predetermined distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified according to a size and a resolution of the display device.

The common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is disposed on a surface of the pixel electrode 191 facing the color conversion panel 20. When the second insulating layer 250 is omitted, the first alignment layer 11 may be disposed immediately above the pixel electrode 191 or the first insulating layer 240. A second alignment layer 21 is disposed between the common electrode 270 and the liquid crystal layer 3 so as to face the first alignment layer 11.

The first alignment layer 11 and the second alignment layer 21 may be formed as vertical alignment layers, and may be made of alignment materials such as polyamic acid, polysiloxane, and polyimide. The first and second alignment layers 11 and 21 may be connected to each other at the edges of the pixel areas PX. The first and second alignment layers 11, 21 may also be formed within each microcavity 305.

A liquid crystal layer configured by liquid crystal molecules 310 is formed in each microcavity 305. The liquid crystal molecules 310 have negative dielectric anisotropy, and may stand up in a direction perpendicular to the substrate 110 when no electric field is applied. That is, the liquid crystal molecules 310 may be vertically aligned.

The first subpixel electrode 191h and the second subpixel electrode 191l to which the data voltages are applied generate an electric field together with the common electrode 270 to determine directions of the liquid crystal molecules 310 disposed in the microcavity 305 between the two electrodes 191 and 270. Luminance of light passing through the liquid crystal layer varies according to the directions of the liquid crystal molecules 310 determined as above.

A third insulating layer 350 may be further disposed on a surface of the common electrode 270 facing the color conversion panel 20. The third insulating layer 350 may be made of an inorganic insulating material such as a silicon nitride (SiNx), a silicon oxide (SiOx), and a silicon oxynitride (SiOxNy), and may be omitted as necessary.

A roof layer 360 is disposed on a surface of the third insulating layer 350 facing the color conversion panel 20. The roof layer 360 may be made of an organic material. The microcavity 305 is formed below the roof layer 360, and the roof layer 360 is hardened by a curing process to maintain the shape of the microcavity 305. That is, the roof layer 360 is formed to be spaced apart from the pixel electrode 191 with the microcavities 305 therebetween.

The roof layers 360 are formed in each pixel area PX along a pixel row and in the second valley V2, but the roof layer 360 is not formed in, i.e. is removed from, the first valley V1. That is, the roof layer 360 is not formed between the first subpixel area PXa and the second subpixel area PXb. The microcavity 305 is formed below each roof layer 360 at each of the first subpixel area PXa and the second subpixel area PXb. In the second valley V2, the microcavity 305 is not formed below the roof layer 360, but is formed to be attached to the insulating substrate 110. Accordingly, a thickness of the roof layer 360 disposed at the second valley V2 may be larger than a thickness of the roof layer 360 disposed at each of the first subpixel area PXa and the second subpixel area PXb. The upper surface and both sides of the microcavity 305 are formed to be covered by the roof layer 360.

An injection hole 307 exposing a part of the microcavity 305 is formed in the common electrode 270, the third insulating layer 350, and the roof layer 360. The injection holes 307 may be formed to face each other at the edges of the first subpixel area PXa and the second subpixel area PXb. That is, the injection holes 307 may correspond to the lower side of the first subpixel area PXa and the upper side of the second subpixel area PXb to expose the sides of both microcavities 305 of a pixel. Since each microcavity 305 is exposed by an injection hole 307, an aligning agent, a liquid crystal material, or the like may be injected into the microcavity 305 through the injection hole 307.

A fourth insulating layer 370 may be disposed on a surface of the roof layer 360 facing the color conversion panel 20, and an overcoat 390 may be disposed on a surface of the fourth insulating layer 370 facing the color conversion panel 20. In this case, the fourth insulating layer 370 may be omitted.

The overcoat 390 is formed to cover the injection holes 307. That is, the overcoat 390 may seal each microcavity 305 so as to prevent the liquid crystal molecules 310 formed in the microcavity 305 from being discharged to the outside, or leaking out. Since the overcoat 390 contacts the liquid crystal molecules 310, the overcoat 390 is made of a material which does not react with liquid crystal molecules 310.

The overcoat 390 may be formed as a multilayer structure such as a double layer or a triple layer. The double layer is configured with two layers made of different materials. The triple layer is configured with three layers, and materials of adjacent layers are different from each other. For example, the overcoat 390 may include a layer made of an organic insulating material and a layer made of an inorganic insulating material.

As described hereinabove, the color conversion panel 20 may be provided facing one surface of the display panel 50 to provide much more improved color reproducibility while polarizing light that is incident from the light assembly 500, and the polarizer 12 is provided on another surface of the display panel 50 which does not face the color conversion panel 20.

Since the color conversion panel 20 not only improves color reproducibility but also provides a polarization function, a polarizer provided in the surface of the display panel 20 where the color conversion panel 20 is provided may be omitted.

The color conversion panel 20 according to the present exemplary embodiment shown in FIG. 8 and FIG. 9 may contact the overcoat 390. That is, in the liquid crystal display where the light assembly 500, the color conversion panel 20, and the display panel 50 are sequentially layered, and the insulating substrate 110 of the display panel 50 is provided in a suitable location so as to dispose the overcoat 390 on the color conversion panel 20.

Thus, referring to the exemplary embodiment shown in FIG. 8 and FIG. 9, the color conversion panel 20 is provided on the light assembly 500, the display panel 50 is disposed to make the color conversion panel 20 and the overcoat 390 contact each other, and a single polarizer 12 may be provided at only one side of the insulating substrate 110 of the display panel 50.

According to the present exemplary embodiment, blue light B is incident on the bottom surface of the color conversion panel 20 by the light assembly 500. The blue light B is passed through the color conversion layer 23 which has a red quantum rod and a green quantum rod, and is thus output as white light W polarized in one direction. Next, the white light W is passed through the display panel 50 and is thus output as red light R, green light G, and blue light B according to the color filters 230R, 230G, and 230B.

In this case, light that is incident upon the color conversion layer 23 is polarized in the alignment direction of the quantum rods 27G and 27R and then emitted, and a transmissive axis of the color conversion layer 23 is identical to the arrangement direction of the quantum rods 27G and 27R.

The polarized white light passes through the display panel 50 to be output as red light R, green light G, and blue light B according to the color filters 230R, 230G, and 230B.

The output red light R, green light G, and blue light B are emitted in all directions, and accordingly, a view angle of the liquid crystal display device according to the exemplary embodiment of the present invention can be improved (i.e. widened), and display quality can be improved through higher color purity and color reproducibility.

Figure 10:
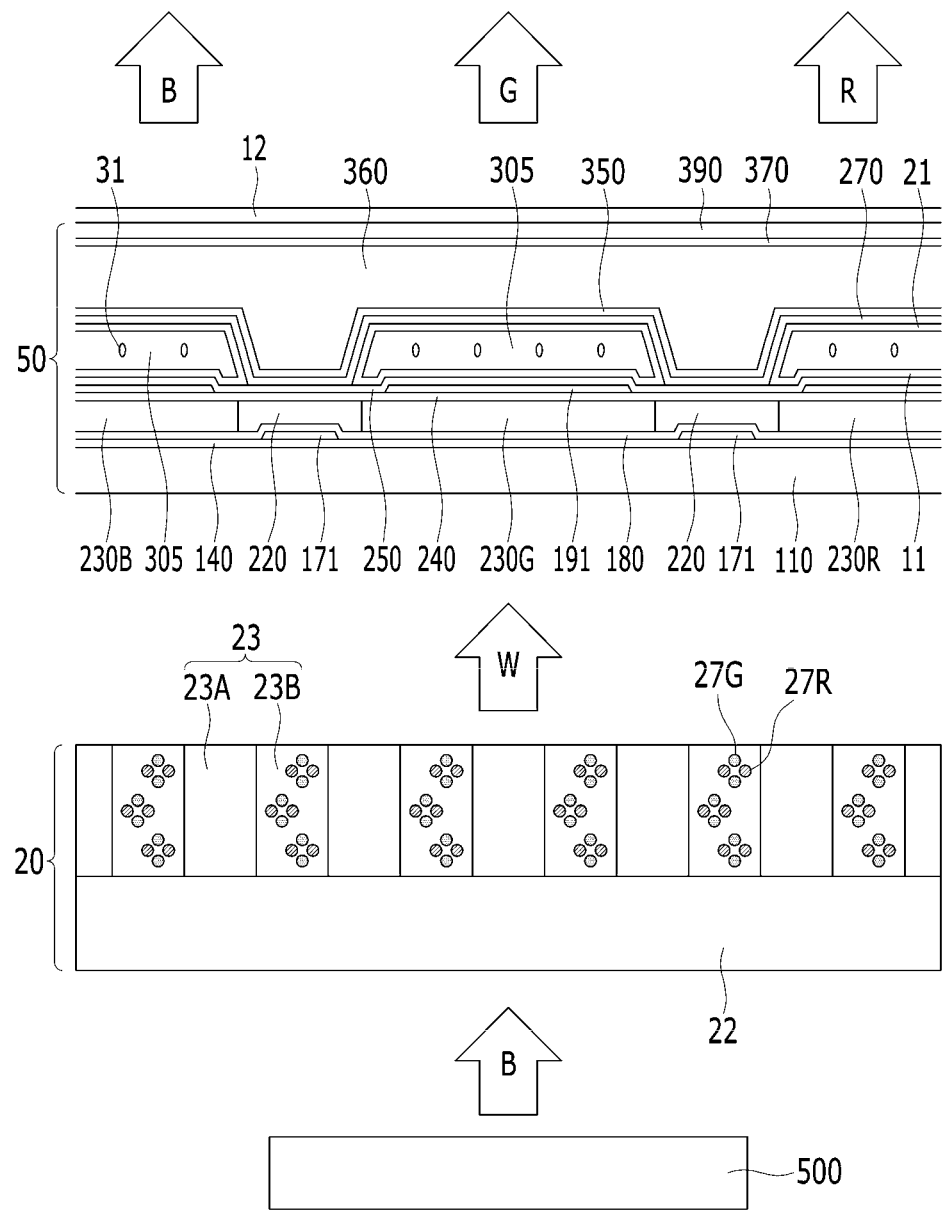
FIG. 10 is a cross-sectional view of a display device according to another exemplary embodiment of the present invention.

However, the exemplary embodiment shown in FIG. 8 and FIG. 9 is not restrictive, and as shown in FIG. 10, in a liquid crystal display where a light assembly 500, a color conversion panel 20, and a display panel 50 are sequentially layered, an insulating substrate 110 of the display panel 50 may be provided at a lower side of the panel 50. That is, the insulating substrate 110 of the display panel 50 is located to be in contact with the color conversion panel 20, and an overcoat 390 may be provided at an upper side of the panel 50.

That is, the color conversion panel 20 is provided above the light assembly 500, and the display panel 50 is disposed so that the color conversion panel 20 and the insulating substrate 110 contact each other. In this case, a polarizer 12 may be provided on a side of the panel 50 that does not face the color conversion panel 20, i.e., an upper side of the overcoat 390.

According to the exemplary embodiment of the present invention, arrangement of the light assembly 500, the color conversion panel 20 and the display panel 50, and arrangement of constituent elements of the display panel 50 may be the same as that shown in FIG. 8 and FIG. 9. The display panel 50 in FIG. 10 may be identical to the display panel 50 in FIG. 8 and FIG. 9.

As above, in some embodiments of the invention, the insulating substrate 110 is disposed on the color conversion panel 20, the gate conductor is disposed on the insulating substrate 110, and the gate insulating layer 140 is disposed on the gate conductor. The data conductor is disposed on the gate insulating layer 140, the passivation layer 180 is disposed on the data conductor, and the color filters 230R, 230G, and 230B and the light blocking member 220 are disposed on the passivation layer 180.

Also, the first insulating layer 240 is disposed on the color filters 230R, 230G, and 230B and the light blocking member 220, the pixel electrode 191 is disposed on the first insulating layer 240, and the first alignment layer 11 is disposed on the pixel electrode 191.

A liquid crystal layer is provided in a plurality of microcavities 305 and on the first alignment layer 11. The first and second alignment layers 11 and 21 may be connected to each other at the edge of their pixel area PX. The common electrode 270 is disposed on the second alignment layer 21, and the third insulating layer 350 is disposed on the common electrode 270. The roof layer 360 is disposed on the third insulating layer 350, and the fourth insulating layer 370 is disposed on the roof layer 360. The overcoat 390 is disposed on the fourth insulating layer 370.

Figure 11:
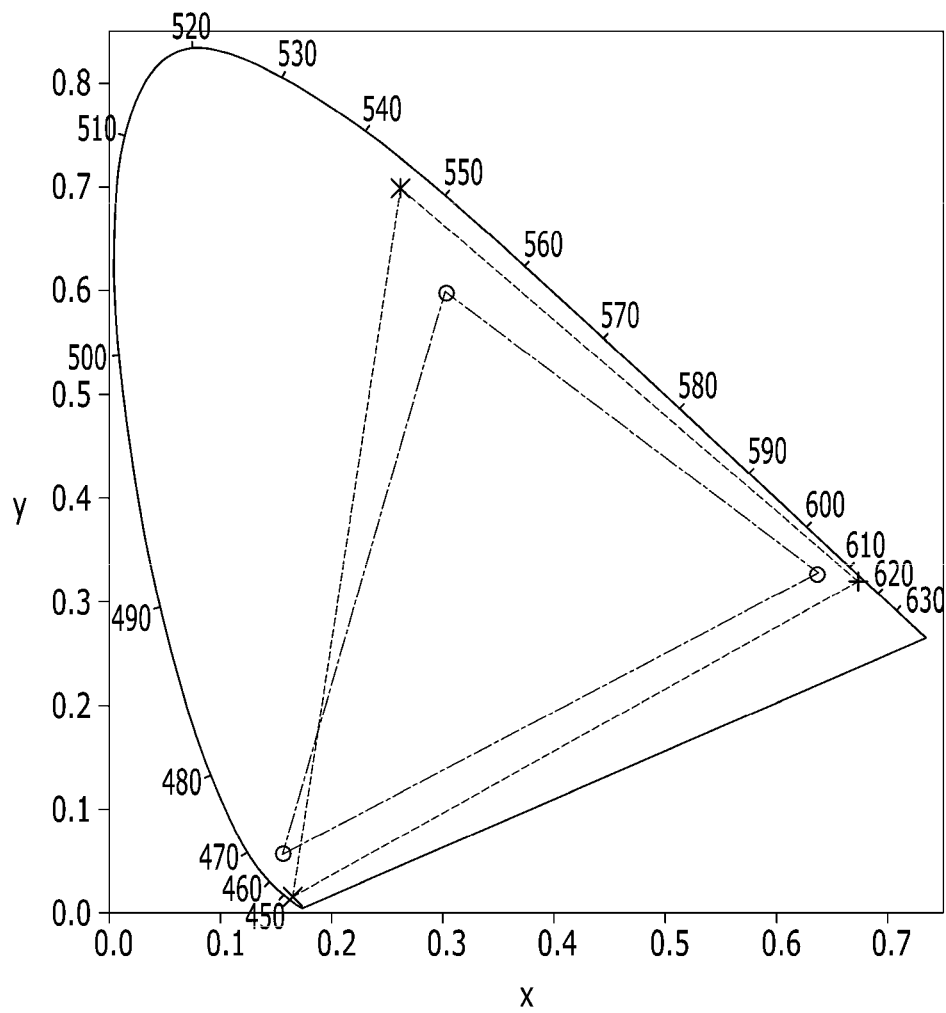
FIG. 11 is a simulation result of color reproducibility of a display device according to the present invention.

Hereinafter, the degree of improvement of color reproducibility of the display device according to the present invention will be reviewed with reference to FIG. 11. FIG. 11 is a simulation result of color reproducibility for a display device according to the present invention.

Reviewing FIG. 11, it can be seen that in the display device X according to exemplary embodiments of the present invention, color reproducibility is improved as the display's gamut is increased relative to that of a conventional display device O. That is, a more vivid color may be perceived by the user. The display device according to the exemplary embodiment of the present invention exhibits color reproducibility of about 102% as compared to existing display devices. Therefore, as described above, the liquid crystal display including a color conversion layer using a block copolymer may provide more improved color reproducibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

DESCRIPTION OF SYMBOLS

| 10: Display panel | 20: Color conversion layer |
|---|---|
| 23: Block copolymer | 27: Quantum rod |

What is claimed is:

1. A liquid crystal display comprising:
   a display panel; and
   a color conversion panel coupled to the display panel and having a color conversion layer,
   wherein the color conversion layer includes:
      a block copolymer including a first copolymer and a second copolymer; and
      quantum rods dispersed within the block copolymer,
   wherein the block copolymer includes:
      a first block structure unit formed by the first copolymer; and
      a second block structure unit formed by the second copolymer, and
   wherein the quantum rods are disposed within either one of the first block structure unit and the second block structure unit.

2. The liquid crystal display of claim 1, wherein at least one of the first block structure unit and the second block structure unit has a lamellar or cylindrical shape.

3. The liquid crystal display of claim 1, wherein the quantum rods are arranged to be oriented substantially along one direction.

4. The liquid crystal display of claim 1, wherein the quantum rods include a red quantum rod and a green quantum rod.

5. The liquid crystal display of claim 1:
   wherein the liquid crystal display further comprises a light assembly adjacent to the color conversion panel; and
   wherein the color conversion panel is provided between the light assembly and the display panel, and the light assembly comprises a light emitting diode.

6. The liquid crystal display of claim 5, wherein the light emitting diode is configured to emit light in a predetermined wavelength band such as ultraviolet rays or blue light.

7. The liquid crystal display of claim 5, wherein the color conversion panel further comprises a lower insulating substrate, and the color conversion layer is provided on the lower insulating substrate.

8. The liquid crystal display of claim 7, wherein the display panel comprises:
   a thin film transistor provided on the color conversion layer;
   a pixel electrode connected to the thin film transistor;
   an upper insulating substrate spaced apart from and facing the pixel electrode;
   a liquid crystal layer provided between the lower insulating substrate and the upper insulating substrate; and
   a common electrode provided between the upper insulating substrate and the liquid crystal layer.

9. The liquid crystal display of claim 8, wherein the liquid crystal display further comprises a lower insulating layer provided between the color conversion layer and the thin film transistor.

10. The liquid crystal display of claim 8, further comprising a polarizer provided on the upper insulating substrate.

11. The liquid crystal display of claim 7, wherein the display panel comprises:
    an insulating substrate facing the lower insulating substrate;
    a thin film transistor provided on a surface of the insulating substrate that faces the lower insulating substrate;
    a pixel electrode connected to the thin film transistor;
    a roof layer facing the pixel electrode; and
    a liquid crystal layer provided in a plurality of microcavities positioned between the pixel electrode and the roof layer.

12. The liquid crystal display of claim 11, further comprising an overcoat positioned between the color conversion layer and the roof layer.

13. The liquid crystal display of claim 12, further comprising:
    a polarizer provided on the insulating substrate; and
    a common electrode arranged to form an electric field together with the pixel electrode.

14. The liquid crystal display of claim 7, wherein the display panel comprises:
    an insulating substrate provided on the color conversion layer;
    a thin film transistor provided on the insulating substrate;
    a pixel electrode connected to the thin film transistor;
    a roof layer facing the pixel electrode; and
    a liquid crystal layer provided in a plurality of microcavities positioned between the pixel electrode and the roof layer.

15. The liquid crystal display of claim 14, further comprising:
    a polarizer provided on the roof layer; and
    a common electrode arranged to form an electric field together with the pixel electrode.

* * * * *